US012633617B2

(12) United States Patent
Hickey et al.

(10) Patent No.: US 12,633,617 B2
(45) Date of Patent: May 19, 2026

(54) BATTERY ASSEMBLIES, VEHICLES, AND METHODS WITH GAS MANIFOLD LINERS AND BATTERY TRAY SEALS FOR IMPROVED CELL GAS VENTING

(71) Applicant: GM GLOBAL TECHNOLOGY OPERATIONS LLC, Detroit, MI (US)

(72) Inventors: Ryan P. Hickey, Austin, TX (US); Phillip D. Hamelin, Clarkston, MI (US); Alexander M. Bilinski, Avoca, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 665 days.

(21) Appl. No.: 18/177,890

(22) Filed: Mar. 3, 2023

(65) Prior Publication Data

US 2024/0297400 A1     Sep. 5, 2024

(51) Int. Cl.
H01M 50/367     (2021.01)
H01M 10/613     (2014.01)
(Continued)

(52) U.S. Cl.
CPC ....... H01M 50/367 (2021.01); H01M 10/613 (2015.04); H01M 10/653 (2015.04);
(Continued)

(58) Field of Classification Search
CPC ............. H01M 50/367; H01M 10/613; H01M 10/653; H01M 10/6554; H01M 10/658; H01M 50/249; H01M 50/3425; H01M 10/625; H01M 2220/20; H01M 10/6556; H01M 10/6566; H01M 50/24; H01M 50/244; Y02E 60/10; B60L 50/64; B60L 58/26
See application file for complete search history.

(56) References Cited

U.S. PATENT DOCUMENTS

| | | | |
|---|---|---|---|
| 4,350,026 A | 9/1982 | Klein | |
| 6,889,515 B2 | 5/2005 | Tilton et al. | |

(Continued)

FOREIGN PATENT DOCUMENTS

| | | | |
|---|---|---|---|
| WO | WO2021041935 | * | 3/2021 |
| WO | WO2022194470 | * | 9/2022 |

*Primary Examiner* — Lisa S Park
(74) *Attorney, Agent, or Firm* — Quinn IP Law

(57) ABSTRACT

Presented are battery assemblies with gas manifold liners and support tray seals for optimized gas venting, methods for making/using such battery assemblies, and vehicles equipped with such battery assemblies. A battery assembly, such as a rechargeable high-voltage traction battery pack, includes a support tray that seats thereon a cold plate. The cold plate is formed with a thermally conductive material and includes a gas manifold that exhausts gases from the battery assembly. At least one battery cell is supported on the cold plate and includes a cell case that contains a galvanic electrochemical cell and has a cell vent fluidly coupled with the gas manifold. A manifold liner is located within and abuts opposing walls of the gas manifold. The manifold insert includes one or more thermal barrier layers, each formed with a thermally insulating material, and one or more electrical barrier layers, each formed with an electrically insulating material.

20 Claims, 4 Drawing Sheets

(51) Int. Cl.

| | |
|---|---|
| *H01M 10/625* | (2014.01) |
| *H01M 10/653* | (2014.01) |
| *H01M 10/6554* | (2014.01) |
| *H01M 10/658* | (2014.01) |
| *H01M 50/249* | (2021.01) |
| *H01M 50/342* | (2021.01) |

(52) U.S. Cl.

CPC ..... *H01M 10/6554* (2015.04); *H01M 10/658* (2015.04); *H01M 50/249* (2021.01); *H01M 50/3425* (2021.01)

(56) References Cited

U.S. PATENT DOCUMENTS

| | | | |
|---|---|---|---|
| 6,955,063 B2 | 10/2005 | Adiga et al. | |
| 8,329,325 B2 | 12/2012 | Brodie et al. | |
| 8,383,260 B2 | 2/2013 | Essinger et al. | |
| 8,435,668 B2 | 5/2013 | Kumar et al. | |
| 8,563,154 B2 | 10/2013 | Graban et al. | |
| 8,852,772 B2 | 10/2014 | McDonald | |
| 9,533,600 B1 | 1/2017 | Schwab et al. | |
| 10,003,112 B1 | 6/2018 | Boor et al. | |
| 10,923,287 B1 | 2/2021 | Coppola et al. | |
| 11,387,505 B2 | 7/2022 | Hickey et al. | |
| 11,450,920 B2 | 9/2022 | Hamelin et al. | |
| 2013/0059175 A1* | 3/2013 | Engel | H01M 10/0413 |
| | | | 429/82 |
| 2017/0012330 A1* | 1/2017 | Kim | H01M 10/663 |
| 2017/0069885 A1* | 3/2017 | Zanoni | H01M 10/399 |
| 2017/0253141 A1 | 9/2017 | Hsu et al. | |
| 2020/0388893 A1 | 12/2020 | Schoenherr et al. | |
| 2022/0102780 A1 | 3/2022 | Hickey et al. | |
| 2022/0158146 A1* | 5/2022 | Janarthanam | H01M 50/249 |
| 2022/0223936 A1 | 7/2022 | Garrick et al. | |
| 2022/0320677 A1* | 10/2022 | Guo | H01M 50/164 |
| 2024/0063471 A1* | 2/2024 | Franke | H01M 10/625 |

* cited by examiner

BATTERY ASSEMBLIES, VEHICLES, AND METHODS WITH GAS MANIFOLD LINERS AND BATTERY TRAY SEALS FOR IMPROVED CELL GAS VENTING

INTRODUCTION

The present disclosure relates generally to electrochemical devices. More specifically, aspects of this disclosure relate to thermal management systems for regulating the operating temperatures of battery cells in rechargeable, multicell battery assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative rails of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise that may push the battery assembly towards an unstable state. Such thermal events, if left unchecked, may lead to a more accelerated heat-generating state called "thermal runaway", a condition in which the battery system is unable to return the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels, plates, and pipes within the battery case. In contrast, direct liquid cooling systems—or "liquid immersion cooling" (LIC)—immerse the battery cells/modules within a direct-conduction dielectric liquid coolant.

SUMMARY

Presented herein are battery assemblies with gas manifold liners and battery tray seals for optimized venting of cell-generated gases, methods for making and methods for using such battery assemblies, and motor vehicles equipped with such battery assemblies. By way of example, a rechargeable HV battery pack contains parallel rows of electrically interconnected prismatic or cylindrical battery cells that are supported on a subjacent "heat sink" cold plate and sandwiched between coolant-fluid transmitting cooling plates. A pair of structurally reinforcing end plates are located on opposing ends of each cell row and interconnected with the cooling plates to physically surround the battery cells. Each cell contains at least two working electrodes, an ion-conducting electrolyte material, and a permeable separator sheet, all of which are enclosed inside an insulated cell case. A bottom end of each battery cell case includes a vent port through which cell-borne gases are vented from the case during a high-temperature thermal event, such as thermal runaway. The battery cells are packaged inside a protective battery pack container such that the cell vent ports align with a gas vent manifold in the cold plate.

To help prevent thermal runaway propagation (TRP), a thermally insulating and electrically isolating manifold liner sleeve is inserted into and covers the internal surfaces of the battery pack's gas manifold. This manifold liner may be a multipart construction with opposing top and bottom thermal barrier inserts that extend the length of and define top and bottom walls of the manifold. Each thermal insert may be formed from a thin mica sheet. The top mica sheet may have a perforated or reduced-thickness frangible center that is designed to rupture at a given surface pressure, e.g., to enable blowout of cell gases into the manifold while retaining barrier contact to prevent TR propagation. The manifold liner may also include opposing left and right electrical isolation inserts that extend the length of and sit flush against left and right walls of the gas manifold. These isolation inserts may be formed from L-shaped or C-shaped fiber reinforced polymer (FRP) rails, e.g., that maintain electrical isolation and prevent arcing during TR. A thermal seal may be inserted at the interfaces between the manifold liner and cold plate, the cold plate and a subjacent pack support tray, and/or a side face of the cold plate and a top face of the support try. The seal may be formed from a pliable and noncorrosive intumescent putty that thermally expands while maintaining adhesion and sealing during high-temperature thermal events.

Attendant benefits for at least some of the disclosed concepts include battery assemblies with gas manifold liner and plate-to-tray seals for enhanced cell gas venting with reduced TR propagation. A manifold liner sleeve may cover and thermally insulate substantially all internal surfaces of the vent manifold in the cold plate to help prevent cell-to-cell heat propagation and thereby prevent cascading thermal runaway conditions. The liner sleeve may also electrically insulate the vent manifold to help prevent electrical arcing from the cells through the vent gases to neighboring RESS hardware. A conformable thermal seal between the manifold liner, cold plate, and support tray may act as a thermally expansive firestop that helps to prevent leakage of cell-borne gases from the manifold. In addition to optimized gas venting performance and increased thermal/electrical isolation of the manifold, thermal management is improved with a concomitant increase in battery capacity, which leads to improvements in vehicle efficiency and increased driving range.

Aspects of this disclosure are directed to gas manifold liners and support tray seals for optimized venting of cell-borne gases from battery assemblies, including both automotive and non-automotive applications alike. In a non-limiting example, a battery assembly is constructed with a cold plate that is formed, in whole or in part, from a thermally conductive material and is located adjacent one or more battery cells, such as a row of lithium-class prismatic or cylindrical battery cells. Extending through the cold plate is a gas manifold that aggregates and exhausts cell-borne gases from the battery assembly. Each battery cell includes a protective cell case that contains a galvanic electrochemical cell and has a cell vent through which cell-generated gases are expelled into the gas manifold. A single-piece or multipiece manifold liner is located within the gas manifold, abutting inner surfaces of opposing walls of the manifold. The manifold liner includes one or more thermal barrier layers, each formed with a thermally insulating material, and one or more electrical barrier layers, each attached to the thermal barrier layer(s) and formed with an electrically insulating material.

Additional aspects of this disclosure are directed to motor vehicles with traction battery packs furnished with gas manifold liners and support tray seals for optimized venting of cell-borne gases. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, photovoltaic systems, pumping equipment, wind turbine farms, pumping equipment, machine tools, server systems, etc. While not per se limited, disclosed concepts may be particularly advantageous for use with lithium-class prismatic and cylindrical battery cells.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body via a battery support tray and operable to power the traction motor(s). In addition to the pack and motor, the vehicle may include an active thermal management (ATM) system, a vehicle battery charging (VBC) system, and any attendant peripheral hardware.

Continuing with the preceding discussion, the vehicle's traction battery pack includes a cold plate that is seated on and secured to the battery support tray, is formed from a thermally conductive material (e.g., to provide heat sink functionality), and contains a gas manifold through which gases are exhausted from the traction battery pack. The cold plate buttresses a row of rechargeable battery cells, each of which includes a cell case that contains a galvanic electrochemical cell and has a cell vent through which cell-generated gases are expelled from the cell case into the gas manifold. Located within the gas manifold is a manifold liner sleeve that abuts opposing inner surfaces of the manifold. The manifold liner sleeve may have a hollow rectangular cylinder shape defined by opposing first (top) and second (bottom) thermal barrier layers interconnected with opposing first (left) and second (right) electrical barrier layers. Each thermal barrier layer is formed, in whole or in part, from a thermally insulating material, whereas each electrical barrier layer is formed, in whole or in part, from an electrically insulating material. One or more fluid seal strips are formed with a conformable and self-adhering thermally expanding material and located between the cold plate and the manifold liner and/or battery support tray.

Aspects of this disclosure are also directed to manufacturing workflow processes, computer-readable media, and control logic for making or for using any of the disclosed battery manifold-liner and tray-seal architectures, battery assemblies, and/or motor vehicles. By way of non-limiting example, a method is presented for constructing a battery assembly. This representative method includes, in any order and in any combination with any of the above and below disclosed options and features: receiving a cold plate formed with a thermally conductive material and defining therethrough a gas manifold configured to exhaust gases from the battery assembly; locating a battery cell with a cell case adjacent the cold plate, the cell case containing an electrochemical cell and having a cell vent, the battery cell being located such that the cell vent is in fluid communication with the gas manifold; and locating a manifold liner within and abutting opposing inner surfaces of the gas manifold, the manifold liner including a thermal barrier layer formed with a thermally insulating material and an electrical barrier layer attached to the thermal barrier layer and formed with an electrically insulating material.

For any of the disclosed battery assemblies, methods, and vehicles, the battery assembly may contain multiple thermal barrier layers that extend across and are substantially coterminous with opposing (top and bottom) sides of the gas manifold. For applications in which the gas manifold's top and bottom sides are respectively delineated by the battery cell cases and the battery support tray, one thermal barrier layer may abut bottom ends of the cell cases and one thermal barrier layer may abut a top surface of the support tray. Each thermal barrier layer may be fabricated as a single-piece structure from a thin, flexible mica sheet. The thermal barrier layer separating the cells from the manifold may include a frangible segment that is structurally configured to rupture at a predetermined surface pressure produced by cell gases released by the battery cell(s). This frangible segment may be formed using perforations, a tear seam, and/or a reduced-thickness area. The thermal barrier layers may be substantially parallel with each other and may have substantially the same thickness, width, and length. Alternatively, one thermal barrier layer may have a width/length/thickness distinct from that of the other thermal barrier layer.

For any of the disclosed battery assemblies, methods, and vehicles, the battery assembly may contain multiple electrical barrier layers that extend across and are substantially coterminous with opposing (left and right) sides of the gas manifold. Each electrical barrier layer may be fabricated as a single-piece structure from a glass-fiber reinforced polymer (GFRP) rail. These GFRP rails may be substantially structurally identical to each other, may share a C-shaped transverse cross section, and may each be friction fit onto a respective inwardly projecting flange of the cold plate. The thin mica sheets may be adhered to the GFRP rails to collectively define an elongated, tubular sleeve.

For any of the disclosed battery assemblies, methods, and vehicles, the cold plate's gas manifold may be fluidly sealed via one or more fluid seal strips that are each formed, in whole or in part, from a thermally expanding sealant material. For instance, a first fluid seal strip may be located between the manifold liner and the cold plate (e.g., contained in a first cavity recessed into the cold plate), and a second fluid seal strip may be located between the cold plate and the battery support tray (e.g., contained in a second cavity recessed into the cold plate). Optionally, a third fluid seal strip may adjoin a side surface of the cold plate and a top surface of the battery support tray. Each fluid seal strip may be fabricated as a single-piece structure from a conformable, self-adhering intumescent putty (e.g., a "hard char" sodium silicate material or a "soft char" ammonium polyphosphate material). It may be desirable that opposing sides of the gas manifold each be sealed with one or more fluid seal strips.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
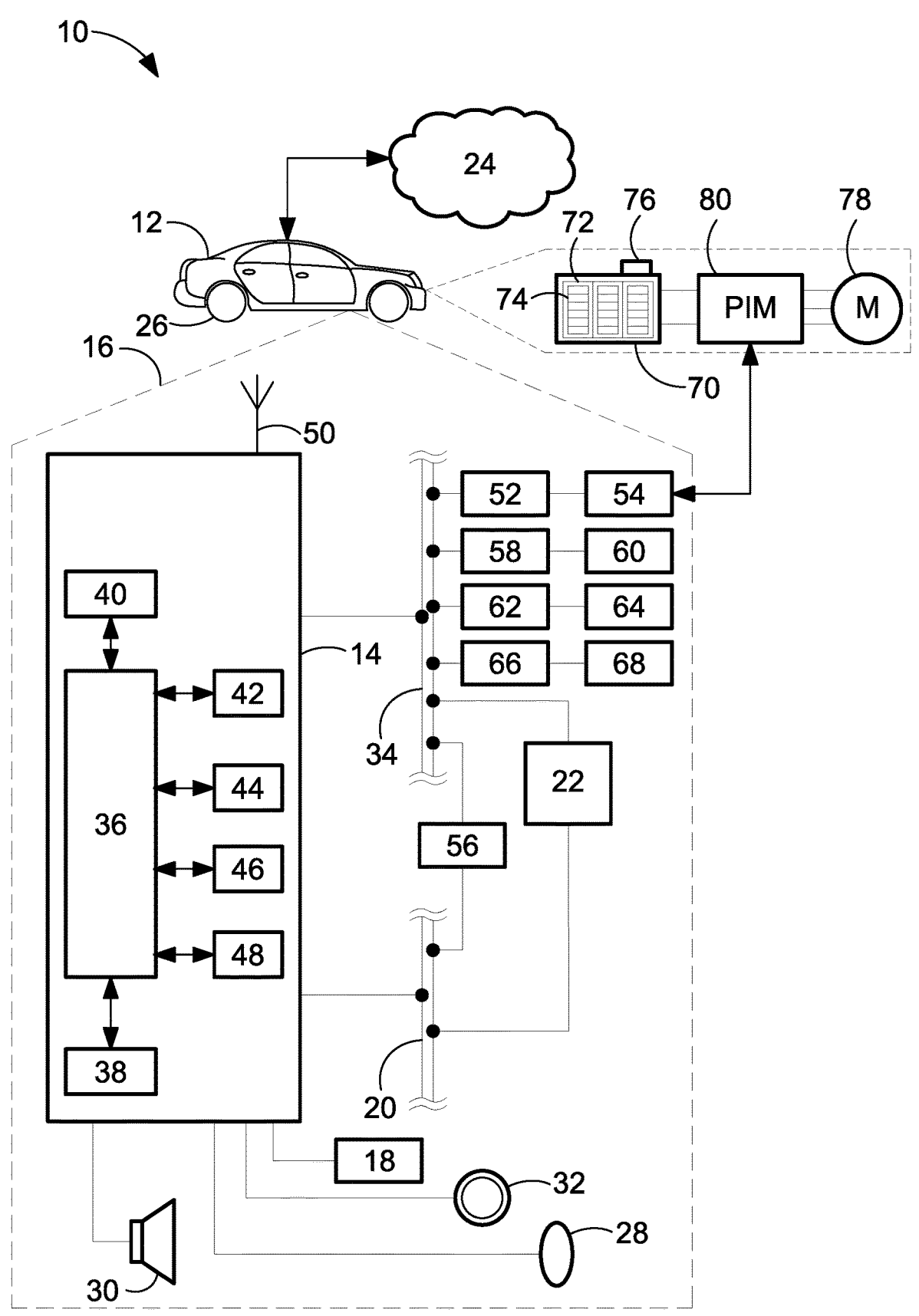
FIG. 1 is a partially schematic, side-view illustration of a representative motor vehicle with an electrified powertrain that is powered by a rechargeable traction battery pack containing gas manifold liners and support tray seals for improved exhausting of cell-borne gases in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; rather, these designations may be used for ease of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Discussed below are battery assembly designs that incorporate gas manifold liners and battery tray seals for optimized exhausting of cell-generated gases with reduced cell-to-cell TR propagation. By way of example, a multicell lithium-class battery module inserts thermally insulating and electrically isolating manifold liner sleeves into the cell gas manifolds of the cold plate to militate against thermal propagation conditions and prevent electrical arcing between TR cells and neighboring cells or the cold plate. Thermally expanding fluid seal strips may be inserted at strategic interface points between the manifold liner and cold plate and between the cold plate and battery support tray to prevent TRP vent gas exposure from the TR cell to heat-sensitive RESS hardware.

Proposed liner-and-seal architectures help to ensure substantially all cell-borne vent gases exit the TR cell or cells within a confined manifold chamber, which directs the gases to a pack ventilation system for evacuation from the battery assembly. In addition to sealing the gas manifold to prevent gas exposure to sensitive components, the manifold is lined with a thermal barrier and an electrical barrier to prevent TR propagation and electrical arcing. A flexible sensor circuit may be integrated into the manifold liner and sealed into the gas manifold to monitor vented cell gases. Disclosed fluid seals may be employed to seal off the battery system's internal coolant plumbing from vent gas exposure to mitigate isolation loss and arcing risk. Integration of a manifold sleeve liner may enclose the gas manifold chamber and electrically/thermally isolate the entire length of the chamber throughout a TRP event.

During battery module assembly, a top mica sheet is adhered or otherwise securely fixed to a top face of the heat-sink cold plate, interposed between the battery cells and the cold plate, to demarcate a top side of the gas manifold. A bottom mica sheet is adhered or otherwise securely fixed onto the battery support tray (or "RESS floor") to demarcate a bottom side of the gas manifold. High-content glass nylon FRP rails are placed onto and cover opposing left and right walls of the gas manifold to provide electrical isolation for mitigation of arcing risk. The stacked battery cells are placed onto the cold plate and quadripartite manifold liner sleeve; the cold plate is then assembled to coolant-transmitting vertical cooling plates. A pliable and thermally expanding intumescent puddy sealant is injected into predefined interface points between the manifold liner and cold plate and between the cold plate and support tray. The bottom mica sheet is adhered or otherwise securely fixed to the FRP rails and the cold plate. The battery module, once loaded on top of the cold plate, is bolted to the battery support tray. Intumescent puddy sealant is then added to the outer edge of the cold plate to complete the seal with the support tray.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain and RESS architectures, incorporated into any logically relevant type of motor vehicle, and utilized for both automotive and non-automotive applications alike. Moreover, only select components of the motor vehicles and battery assemblies are shown and described in additional detail herein. Nevertheless, the vehicles and assemblies discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, base stations, mobile switching centers, satellite service, etc., with a remotely located cloud computing host service 24 (e.g., ONSTAR®). Some of the other in-vehicle hardware components 16 shown in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other auditory commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, magnetic disk, integrated circuit (IC) device, solid-state drive (SSD) memory, hard-disk drive (HDD) memory, flash memory, semiconductor memory (e.g., various types of RAM or ROM), etc.

Long-range communication (LRC) capabilities with off-board devices may be provided via one or more or all of a cellular communication chipset/component, a navigation and location chipset/component (e.g., global positioning system (GPS) transceiver), or a wireless modem, all of which are collectively represented at 44. Short-range communication (SRC) may be provided via a close-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor 78 that is operatively connected to a rechargeable energy storage system (RESS), which may be in the nature of a chassis-mounted traction battery pack 70. The traction battery pack 70 may contain one or more battery modules 72 each housing a group of electrochemical battery cells 74, such as lithium ion, lithium polymer, or nickel metal hydride battery cells of the pouch, can, or prismatic type. One or more electric machines, such as a polyphase, permanent magnet motor/generator (M) unit 78, draw electrical power from and, optionally, deliver electrical power to the battery pack 70. An HC electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Figure 2:
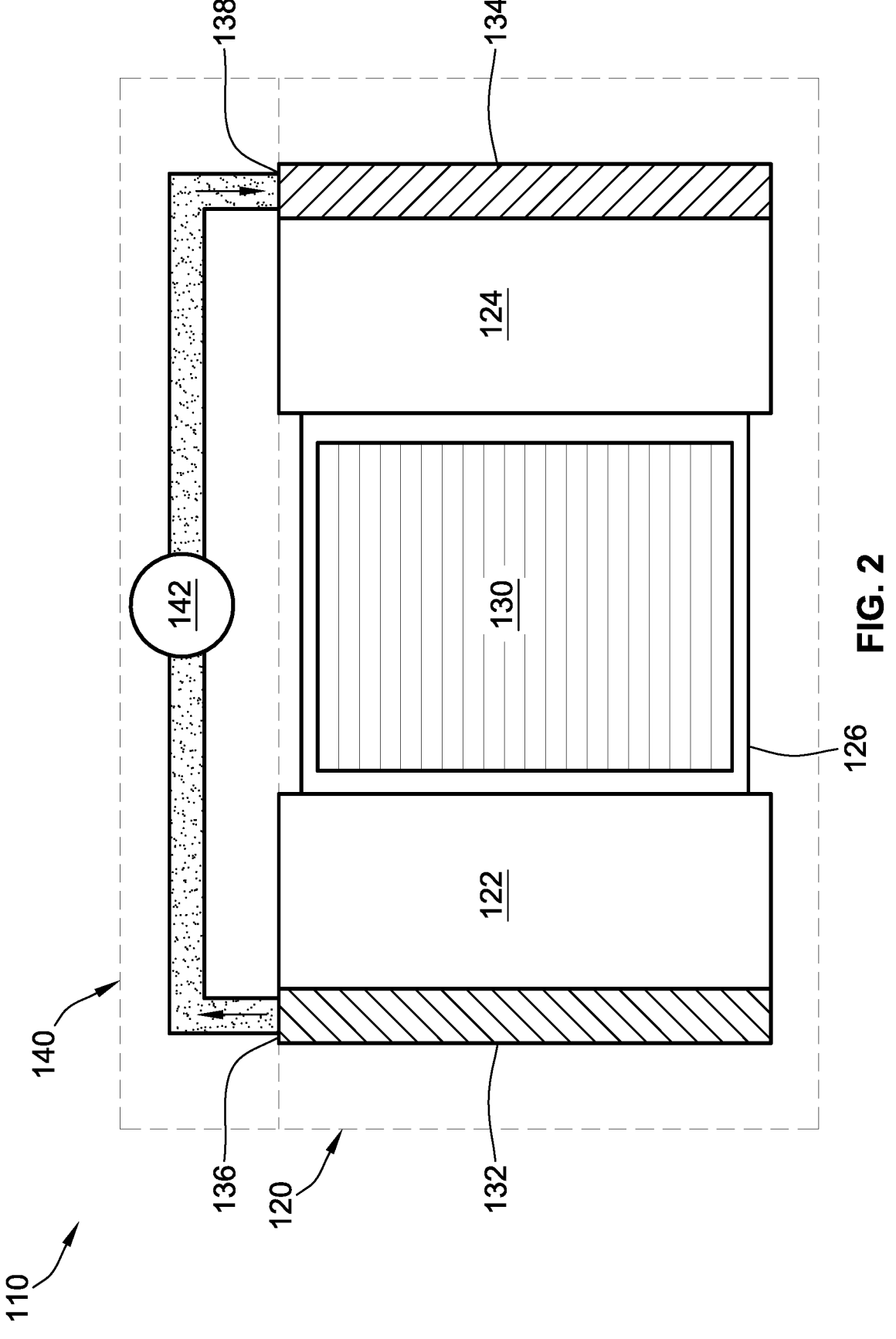
FIG. 2 is a schematic illustration of a representative electrochemical device with which aspects of the present disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. In at least some configurations, the cell housing 120 (or "cell case") may take on a can-like cylindrical construction or a box-like prismatic construction that is formed of aluminum, nickel-plated steel, ABS, PVC, or other suitable material or composite material. The internal and external surfaces of a metallic cell casing may be coated with a polymeric finish to insulate the metal from internal cell elements and from adjacent cells. Although FIG. 2 illustrates a single galvanic monocell unit enclosed within the cell housing 120, it should be appreciated that the housing 120 may stow therein a stack or roll of monocell units (e.g., five to five hundred cells or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the battery cell housing 120 of FIG. 2 and sandwiched between each mated pair of working electrodes 122, 124 is an electrically isolating porous separator 126. The porous separator 126 may be in the nature of an electrically non-conductive, ion-transporting microporous or nanoporous polymeric separator sheet. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition and/or solid electrolyte composition, collectively designated 130, which may also be present in the negative electrode 122 and the positive electrode 124.

A negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system, battery 110 generates electric current that is transmitted to one or more loads 142 operatively connected to the external circuit 140. While the load 142 may be any number of electric devices, a few non-limiting examples of power-consuming and power-storing devices include electric motors for hybrid and full-electric vehicles, photovoltaic systems, standalone power stations and portable power packs, server systems, wind turbine farms, etc. The battery 110 may include a variety of other components that, while not depicted herein for simplicity and brevity, are nonetheless readily available. For instance, the battery 110 may include one or more gaskets, terminal caps, tabs, battery terminals, cooling hardware, charging hardware, and other commercially available components or materials that may be situated on or in the battery 110. Moreover, the size and shape and operating characteristics of the battery 110 may vary depending on the particular application for which it is designed.

Figure 3:
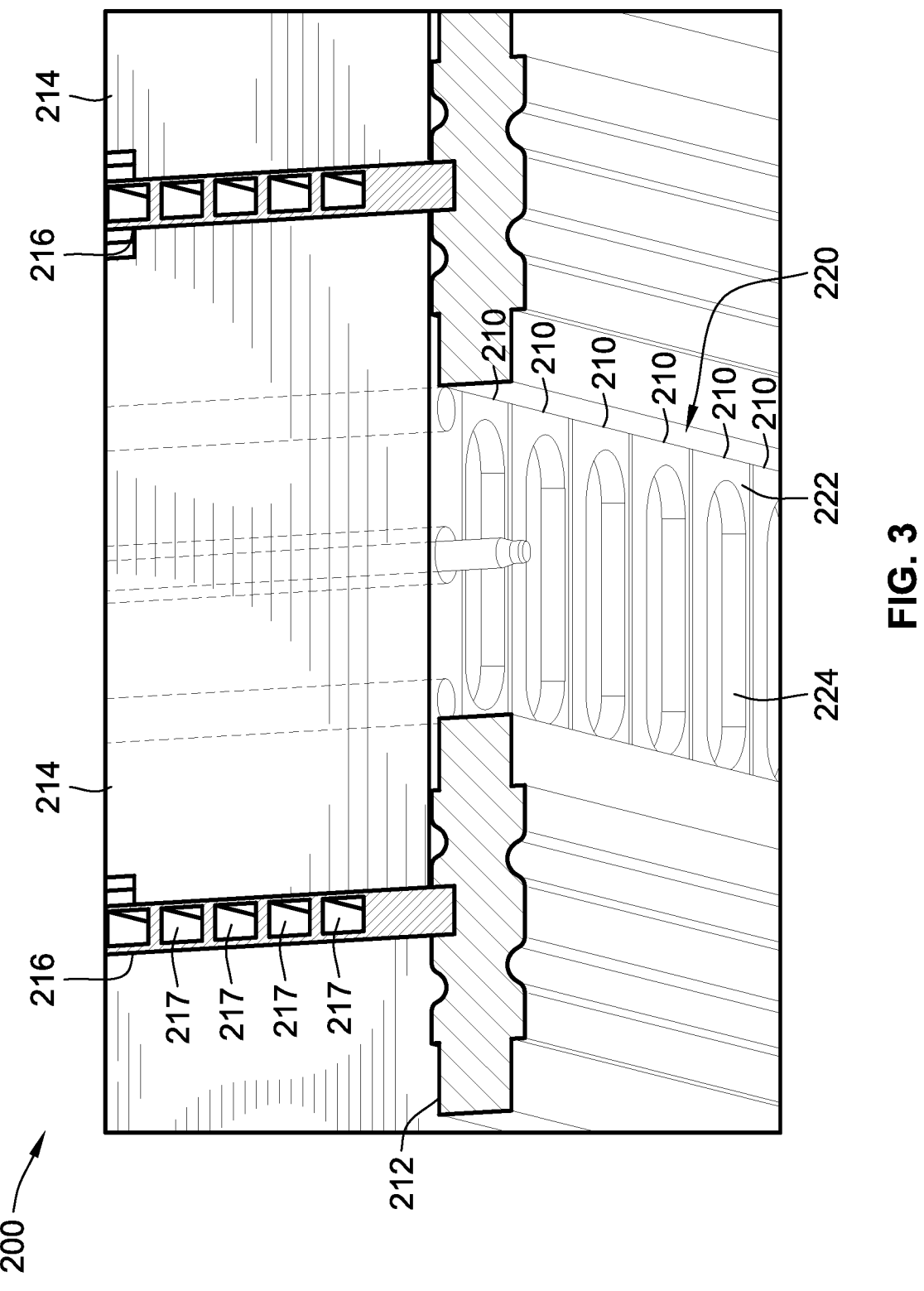
FIG. 3 is a partially sectioned, bottom perspective-view illustration of a representative battery assembly with the battery support tray, manifold liner, and tray seals removed to better view the cold plate gas manifold and mating battery cell gas vents in accord with aspects of the present disclosure.
Figure 4:
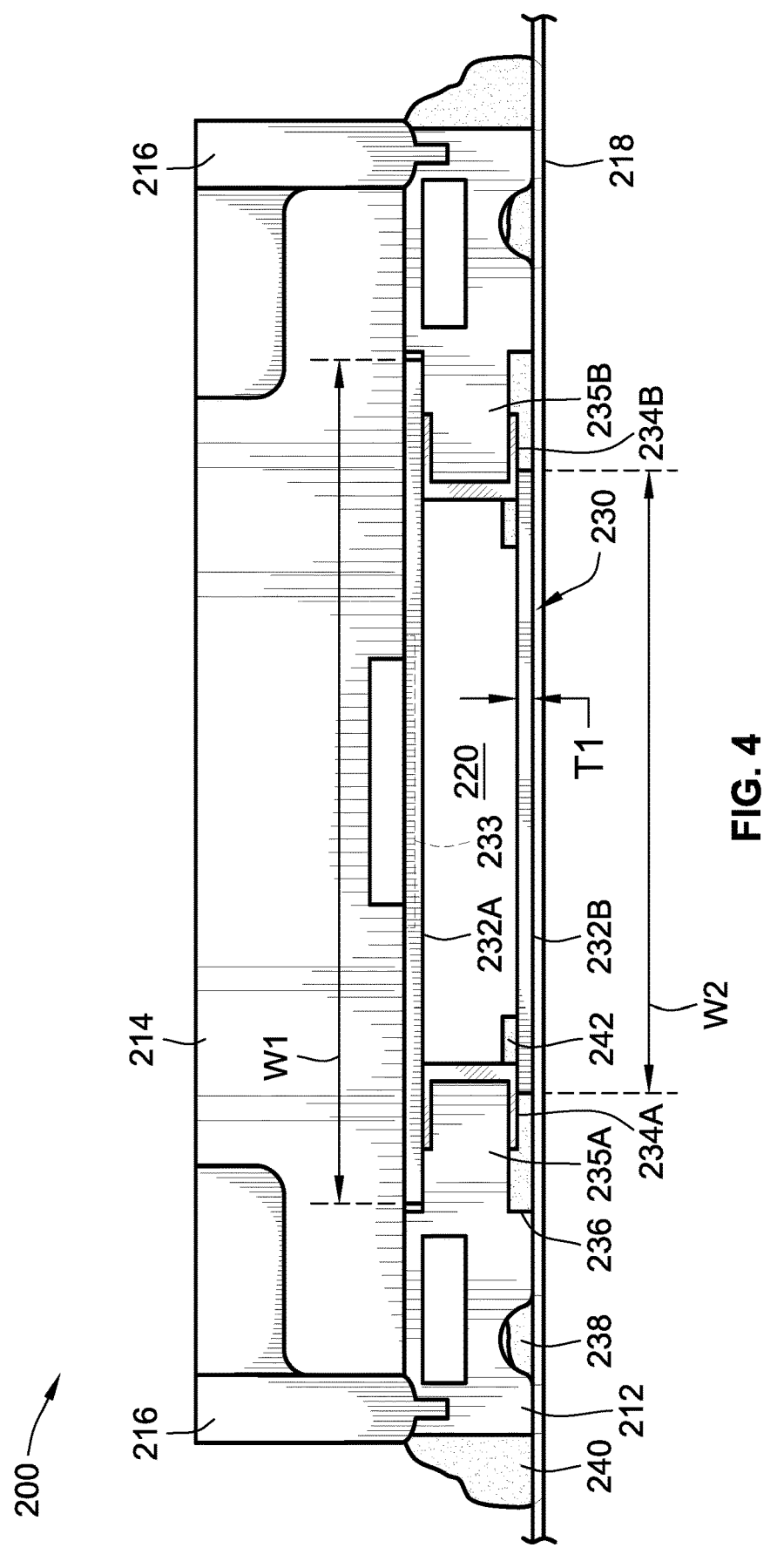
FIG. 4 is an end-view illustration of the representative battery assembly of FIG. 3 with a manifold liner sleeve and multiple support tray seals for the cold plate gas manifold for optimized exhausting of cell-generated gases with reduced cell-to-cell TR propagation.

Turning next to FIGS. 3 and 4, there is shown another non-limiting example of a battery assembly 200 that is adapted for storing and supplying high-voltage electrical energy used, for example, to propel an electric-drive vehicle, such as the FEV automobile 10 of FIG. 1. This battery assembly 200 may be representative of a deep-cycle, high-ampere capacity vehicle battery system that is rated for approximately 350 to 1200 high-voltage direct current (HVDC) or more, for example, depending on a desired vehicle range, gross vehicle weight, and power ratings of the various accessory loads drawing electrical power from the RESS. Although differing in appearance, it is envisioned that any of the features and options described above with reference to the battery pack 70 of FIG. 1 and the lithium-class battery cell 110 of FIG. 2 can be incorporated, singly or in any combination, into the battery assembly 200 of FIGS. 3 and 4, and vice versa. As a representative point of similarity to the traction battery pack 70 of FIG. 1, for example, the battery assembly 200 of FIG. 3 may include a protective, electrically insulated battery assembly housing (not shown) that contains one or more battery cells, examples of which are shown as lithium-class (secondary) prismatic battery cells 210. These battery cells 210 may be arranged in a rectangular array of mutually parallel cell rows and physically mounted onto a heat-dissipating cold plate 212. It should be appreciated that the battery assembly 200 may include greater or fewer battery cells, which may take on similar or alternative form factors. Moreover, the battery assembly housing may be constructed in assorted shapes and sizes using metallic, polymeric, or fiber-reinforced polymer (FRP) materials, including combinations and composites thereof, to satisfy various mechanical, manufacturing, packaging, and thermal design specifications.

Structurally reinforcing end plates 214 (only one visible in FIG. 4) are located on opposing (front and back) ends of each row of stacked battery cell 210, e.g., interposed between the row of cells 210 and battery housing end-walls. For at least some battery pack constructions, one or more end plates 214 may also be interleaved at intermediate positions within the stack to provide additional structural support, as shown in FIG. 3. Coolant-fluid transmitting cooling plates 216 are located on opposing lateral (left and right) sides of the battery cells 210, e.g., interposed between the cells 210 and battery housing sidewalls or neighboring rows of cells 210. Each cooling plate 216 contains an internal network of serpentine flow channels 217 through which is circulated a coolant fluid for extracting heat from the battery cells 210. In accord with the illustrated example, the end plates 214 are vertically oriented and substantially parallel to each other and to the battery cells 210. Comparatively, the cooling plates 216 are vertically oriented, substantially parallel to each other, and mutually orthogonal to the end plates 214 and battery cells 210. The end and cooling plates 214, 216 may be fabricated as discrete metallic components that are then fastened together, sealed, and mounted onto the cold plate 212, e.g., via machine screws, bolts, etc. Once assembled, each row of battery cells 210 is surrounded on a lateral perimeter thereof by the interconnected plates 214, 216. FIG. 4 illustrates a single row of battery cells 210 circumscribed by one pair of end plates 214 and one pair of cooling plates 216; however, the battery assembly 210 may contain multiple rows of battery cells 210 that are segregated from one another by interleaved cooling plates 216 with each row sandwiched between a respect pair of end plates 214.

FIG. 4 shows a subjacent battery support tray 218 (or "RESS floor") that is supporting thereon the battery cells 210, cold plate 212, and interconnected end and cooling plates 214, 216. The battery support tray 218 may be a load-bearing "shear plate" structure that is fabricated, for example, from a pressed sheet metal blank or a resin transfer molded (RTM) FRP panel, and may be rigidly secured to rocker beam sections of a vehicle chassis. With this arrangement, the battery support tray 218 may act as a protective underbody panel for the chassis and as a protective shield for the underside of the battery assembly 200, covering an outboard-facing bottom surface of the cold plate 212. An optional thermoplastic composite doubler plate (not shown) may be pin-jointed or riveted to a ground-facing underside surface of the support tray 218 to provide additional protection for the battery assembly 200.

Interposed between the battery support tray 218 and battery cells 210 is a cold plate 212 that provides subjacent support for and extracts thermal energy from the battery cells 210. The cold plate 212 may be formed, in whole or in part, from a thermally conductive material, such as extruded aluminum or copper or alloys thereof, to function as a passive heat sink structure. Formed within the cold plate 212 is an elongated and substantially rectilinear gas manifold 220, which is located underneath each row of cells 210 to collect cell-generated gases and exhaust these gases from the battery assembly 200. As shown, each gas manifold 220 extends transversely across the entire width of the cold plate 212, with longitudinal ends of the manifold 220 channel opening through transverse sides of the cold plate 212, e.g., to fluidly connect via end caps and baffles with a battery pack ventilation system. Each battery cell 210 includes a protective and electrically insulated cell case 222 that may seat directly on the cold plate 212; the cell case 222 contains a galvanic electrochemical cell (e.g., FIG. 2) and has a cell vent 224 through which cell-generated gases are expelled from the case 222 into the manifold 220. It is envisioned that the battery assembly 200 may contain a single cold plate 212 that is located underneath the battery cells 210 (as shown), a single or multiple cold plates flanking one or both lateral sides of the cells, or a pair of cold plates covering both top and bottom sides of the cells.

To help minimize cell-to-cell heat propagation while preventing cell-to-plate arcing during high-temperature thermal events, such as thermal runaway, a thermally insulating and electrically isolating manifold liner sleeve 230 (also referred to herein as "manifold liner" or "liner" for brevity) is shown in FIG. 4 located within the gas manifold 220 to delimit and cover the interior surfaces of the manifold 220. It may be desirable that the manifold and liner be complimentary in shape and size such that the liner 230 sits substantially flush within the gas manifold 220 and extends substantially the entire length of the manifold 220. To ensure a secure fit, the manifold liner 230 may be fastened to, press fit in, adhered on, or otherwise rigidly attached to the cold plate 212 and, if desired, the battery support tray 218. For applications in which the top and bottom sides of the gas manifold 220 channel open through the cold plate 212 and are respectively delineated by the battery cell cases 222 and the battery support tray 218, as indicated in FIG. 3, the manifold liner 230 may abut the bottom ends of the cell cases 222 and the top surface of the support tray 218 to define a closed or boxed-in manifold channel.

With continuing reference to FIG. 4, the manifold liner 230 may be fabricated as a quadripartite construction with at least one thermal barrier layer, which is formed, in whole or in part, from a thermally insulating material, and at least one electrical barrier layer, which is attached to the thermal barrier layer(s) and formed, in whole or in part, from an electrically insulating material. In accord with the illustrated example, the manifold liner 230 is composed of: (1) a top (first) thermal barrier layer 232A that extends across and is substantially coterminous with a top (first) side of the gas manifold 220; (2) a bottom (second) thermal barrier layer 232B that extends across and is substantially coterminous with a bottom (second) side of the gas manifold 220; (3) a left (first) electrical barrier layer 234A that extends across and is substantially coterminous with a left (third) side of the gas manifold 220; and (4) a right (second) electrical barrier layer 234B that extends across and is substantially coterminous with a right (fourth) side of the gas manifold 220. These four individual layers 232A, 232B, 234A, 234B may be adhered, fastened, or otherwise securely joined to one another to collectively define an elongated, tubular sleeve. It is envisioned that the manifold liner 230 may take on a hollow rectangular prism geometry (as shown) or may take on alternative shapes and sizes to accommodate cell gas manifolds of different shapes/sizes. Moreover, while shown as a four-part assembly, the manifold liner 230 may be fabricated as a bipartite assembly (e.g., with the two thermal barrier layers 232A, 232B formed as a one-piece part and the two electrical barrier layers 234A, 234B formed as a one-piece part), may be fabricated as single-piece component (e.g., all four layers combined into a singular, unitary structure), or may incorporate additional features/layers.

The two thermal barrier layers 232A, 232B are shown in FIG. 4 as thin sheet-like elements that are substantially parallel to and vertically spaced from each other. The first thermal barrier layer 232A may be seated within a complementary top (first) recess in a top (first) surface of the cold plate 212 so as to sit substantially flush with the plate 212. In the same vein, the second thermal barrier layer 232B may be seated within a complementary (second) recess in a bottom (second) surface of the cold plate 212 so as to sit substantially flush with the plate 212. With this arrangement, the first thermal barrier layer 232A may adhere to the cold plate 212 and abut the bottom ends of the battery cell cases 222, whereas the second thermal barrier layer 323B may adhere to and abut a top surface of the support tray 218. It may be desirable, for at least some applications, that the two thermal barrier layers 232A, 232B be substantially the same in lateral width, vertical thickness, and/or longitudinal length. For instance, both thermal barrier layers 323A, 323B may share a thickness T1 of about 1 mm to about 3 mm and may extend the entire length of the gas manifold 220 channel. On the other hand, it may be desirable that the first thermal barrier layer 232A have a distinct (first) width W1 that is different from (e.g., larger) than a distinct (second) width W2 of the second thermal barrier layer 232B.

Each thermal barrier layer 232A, 232B may be fabricated as a single-piece structure from a thin, flexible mica sheet. Non-limiting examples of mica-based materials that may be employed for the thermal barrier layers 323A, 323B include muscovite and phlogopite with a density of about 2.65 to about 3.25 grams per cubic centimeter (g/cm$^3$), a dielectric strength of about 16 to about 22 kilovolts per millimeter (kV/mm), a thermal conductivity of about 0.15 to about 0.35 watts per meter-kelvin (W/(m·K)), and a thermal resistance of about 500 to about 1200 degrees centigrade (C.°). To enable gas blowout from the cell vents 224 into the gas manifold 220, the thermal barrier layer 232A that separates the cells 210 from the manifold 220 may be fabricated with a frangible center segment 233 that is structurally configured to rupture at a predetermined surface pressure (e.g., 95+ kPa), e.g., generated by TR gases released by one or more of the battery cells 210. This frangible segment 233 may be formed using a series of perforations, a tear seam, and/or a reduced-thickness area. Alternatively, the frangible center segment 233 may be replaced by one or more cutout sections that each aligns with a respective one of the battery cell vents 224.

The two electrical barrier layers 234A, 234B are shown in FIG. 4 as contoured clamp-like elements that are mirrored counterparts and are horizontally spaced from each other. The first electrical barrier layer 234A may be press-fit onto a complementary (first) flange 235A projecting into the manifold 220 channel from a first (left) wall of the cold plate 212 such that the barrier layer 234A is sandwiched between the two thermal barrier layers 232A, 232B. In the same vein, the second electrical barrier layer 234B may be press-fit onto a complementary (second) flange 235B projecting into the manifold 220 channel from a second (right) wall of the cold plate 212 such that the barrier layer 234B is also sandwiched between the two thermal barrier layers 232A, 232B. With this arrangement, both electrical barrier layers 234A, 234B may be friction fit, adhered, or otherwise rigidly secured directly to the cold plate 212 so as to cover respective lateral sides of the gas manifold 220. It may be desirable, for at least some applications, that the two electrical barrier layers 234A, 234B be substantially structurally identical to each other.

Each electrical barrier layer 234A, 234B may be fabricated as a single-piece structure from a fiber reinforced polymer rail. These FRP rails are shown in FIG. 4 with a C-shaped transverse cross-section that allows each rail to press-fit onto its respective flange of the cold plate 212. As used herein, the term "C-shaped" may be defined to describe a structural feature or characteristic that is similarly shaped to the capital letter "C" (e.g., having a substantially vertical main body ("stress" section) with a pair of arms ("instroke" and "outstroke" sections) each projecting at a non-parallel angle from a respective opposing end of the main body). Non-limiting examples of a high-glass fill FRP that may be employed for the electrical barrier layer 234A, 234B include a thermoplastic polyamide matrix (e.g., Nylon 66) containing at least about 25% or, for at least some applications, approximately 30-50% by volume glass fibers (e.g., chopped alkali-lime or soda lime glass). It may be desirable these FRP rails be heat-resistant, flame-retardant, and self-extinguishing compositions that exhibit a surface resistivity of at least 1E13 Ohm (Ω) and a volume resistivity of at least 1E12 Ohm-meters (Ω·m).

To help prevent leakage of cell-borne gases from the manifold 220, the battery assembly 200 of FIGS. 3 and 4 may employ one or more conformable thermal seals, each of which is located at a select interface point between the manifold liner 230, cold plate 212, and/or support tray 218. Each seal strip may be formed from a conformable and self-adhering intumescent putty. The putty may be a passive fire-stopping ("firestop") barrier that stops the spread of flames, noxious gases, smoke, etc., e.g., during a thermal runaway event. It may be desirable that the intumescent putty be sufficiently pliable so as to be easily injectable into narrow and/or elongate cavities within the battery assembly 210. Moreover, the putty may exhibit good adhesion and aging properties, provide long-term performance for a re-enterable and repairable solution, and be noncorrosive to metal (e.g., a "hard char" sodium silicate material or a "soft char" ammonium polyphosphate material).

FIG. 4, for example, illustrates a first fluid seal strip 236 that is formed, in whole or in part, from a thermally expanding material and is located between the manifold liner 230 and the cold plate 212, e.g., located in a cavity between the second thermal barrier layer 232B, the first electrical barrier layer 234A, the cold plate flange 235A, and the top surface of the support tray 218. A second fluid seal strip 238, which is formed with same thermally expanding material as the first strip 236, is located between the cold plate 212 and the support tray 218, e.g., nested within a cavity recessed into a bottom face of the cold plate 212. Additionally, a third fluid seal strip 240, which is also formed with the same thermally expanding material, adjoins a side surface of the cold plate 212 and a top surface of the battery support tray 218. An optional fourth fluid seal strip 242, which is also formed with the same thermally expanding material, seals an inner surface of a thermal barrier layer 232B to an inner surface of an electrical barrier layer 234A. As can be seen in FIG. 4, each of the above enumerated fluid seal strips 236, 238, 240, 242 on the left of the gas manifold 220 may have a mirrored counterpart on the right of the manifold 220. It is also within the scope and spirit of this disclosure that the battery assembly 200 of FIGS. 3 and 4 employ greater or fewer seal strips located at similar or alternative locations to that which are shown in the drawings.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly comprising:
  a cold plate formed with a thermally conductive material and defining therethrough a gas manifold configured to exhaust gases from the battery assembly;
  a battery cell including a cell case adjacent the cold plate, the cell case containing an electrochemical cell and having a cell vent in fluid communication with the gas manifold; and
  a manifold liner located within and abutting opposing walls of the gas manifold, the manifold liner including a thermal barrier layer formed with a thermally insulating material and an electrical barrier layer attached to the thermal barrier layer and formed with an electrically insulating material, the electrical barrier layer including a first electrical barrier layer abutting a first inner surface of the gas manifold and a second electrical barrier layer abutting a second inner surface of the gas manifold, wherein the first and second electrical barrier layers each has a C-shaped transverse cross section and is friction fit onto a respective flange of the cold plate.

2. The battery assembly of claim 1, wherein the thermal barrier layer includes first and second thermal barrier layers extending across and substantially coterminous with opposing first and second sides, respectively, of the gas manifold.

3. The battery assembly of claim 2, wherein the first and second thermal barrier layers include first and second flexible mica sheets, respectively.

4. The battery assembly of claim 3, wherein the first thermal barrier layer includes a frangible segment configured to rupture at a predetermined surface pressure produced by cell gases released by the battery cell through the cell vent.

5. The battery assembly of claim 4, wherein the frangible segment of the first flexible mica sheet includes perforations, a tear seam, and/or a reduced-thickness area.

6. The battery assembly of claim 2, wherein the first thermal barrier layer has a first transverse width and the second thermal barrier layer has a second transverse width distinct from the first transverse width.

7. The battery assembly of claim 1, wherein the first and second electrical barrier layers extend across and are substantially coterminous with the first and second inner surfaces, respectively, of the gas manifold.

8. The battery assembly of claim 7, wherein the first and second electrical barrier layers include first and second fiber reinforced polymer (FRP) rails, respectively.

9. The battery assembly of claim 1, further comprising a first fluid seal strip formed with a thermally expanding material and located between the manifold liner and the cold plate.

10. The battery assembly of claim 9, further comprising:
  a battery support tray seating thereon the cold plate; and a second fluid seal strip formed with the thermally expanding material and located between the cold plate and the battery support tray.

11. The battery assembly of claim 10, further comprising a third fluid seal strip formed with the thermally expanding material and adjoining a side surface of the cold plate and a top surface of the battery support tray.

12. The battery assembly of claim 11, wherein the thermally expanding material of the first, second, and third fluid seal strips includes a conformable self-adhering intumescent putty.

13. A motor vehicle, comprising:
a vehicle body with a passenger compartment;
a plurality of road wheels attached to the vehicle body;
a traction motor attached to the vehicle body and operable to drive one or more of the road wheels to thereby propel the motor vehicle; and
a traction battery pack electrically connected to and operable to power the traction motor, the traction battery pack including:
a battery support tray attached to the vehicle body;
a cold plate seated on the battery support tray, formed with a thermally conductive material, and defining therethrough a gas manifold configured to exhaust gases from the traction battery pack;
a plurality of battery cells each including a cell case seated on the cold plate, each of the cell cases containing an electrochemical cell and having a cell vent in fluid communication with the gas manifold;
a manifold liner sleeve located within and abutting opposing inner surfaces of the gas manifold, the manifold liner sleeve including opposing first and second thermal barrier layers, each formed with a thermally insulating material, and opposing first and second electrical barrier layers, each attached to the thermal barrier layers and formed with an electrically insulating material, the first and second electrical barrier layers abutting opposing first and second inner surfaces, respectively, of the gas manifold, wherein the first and second electrical barrier layers each has a C-shaped transverse cross section and is friction fit onto a respective flange of the cold plate; and
a fluid seal strip formed with a conformable and self-adhering thermally expanding material, the fluid seal strip being located between the cold plate and the manifold liner and/or the battery support tray.

14. A method of constructing a battery assembly, the method comprising:

receiving a cold plate formed with a thermally conductive material and defining therethrough a gas manifold configured to exhaust gases from the battery assembly;
locating a battery cell with a cell case adjacent the cold plate, the cell case containing an electrochemical cell and having a cell vent, the battery cell being located such that the cell vent is in fluid communication with the gas manifold; and
locating a manifold liner within and abutting opposing inner surfaces of the gas manifold, the manifold liner including a thermal barrier layer formed with a thermally insulating material and an electrical barrier layer attached to the thermal barrier layer and formed with an electrically insulating material, the electrical barrier layer including a first electrical barrier layer abutting a first inner surface of the gas manifold and a second electrical barrier layer abutting a second inner surface of the gas manifold, wherein the first and second electrical barrier layers each has a C-shaped transverse cross section and is friction fit onto a respective flange of the cold plate.

15. The method of claim 14, wherein the thermal barrier layer includes first and second thermal barrier layers extending across and substantially coterminous with opposing first and second sides, respectively, of the gas manifold.

16. The method of claim 15, wherein the first and second thermal barrier layers include first and second flexible mica sheets, respectively.

17. The method of claim 14, wherein the first and second electrical barrier layers extend across and are substantially coterminous with the first and second inner surfaces, respectively, of the gas manifold.

18. The method of claim 17, wherein the first and second electrical barrier layers include first and second fiber reinforced polymer (FRP) rails, respectively.

19. The method of claim 14, further comprising:
locating the cold plate on a battery support tray;
locating a first fluid seal strip between the manifold liner and the cold plate, the first fluid seal strip being formed with a thermally expanding material; and
locating a second fluid seal strip between the cold plate and the battery support tray, the second fluid seal strip being formed with the thermally expanding material.

20. The method of claim 19, further comprising locating a third fluid seal strip against a side surface of the cold plate and a top surface of the battery support tray, the third fluid seal strip being formed with the thermally expanding material.

*     *     *     *     *